United States Patent [19]

Martinez, Jr. et al.

[11] Patent Number: 5,664,149

[45] Date of Patent: Sep. 2, 1997

[54] COHERENCY FOR WRITE-BACK CACHE IN A SYSTEM DESIGNED FOR WRITE-THROUGH CACHE USING AN EXPORT/INVALIDATE PROTOCOL

[75] Inventors: Marvin Wayne Martinez, Jr.; Mark W. Bluhm; Jeffrey S. Byrne, all of Plano; David A. Courtright, Richardson; Douglas Ewing Duschatko, Plano; Raul A. Garibay, Jr., Richardson; Margaret R. Herubin, Coppell, all of Tex.

[73] Assignee: Cyrix Corporation, Richardson, Tex.

[21] Appl. No.: 151,489

[22] Filed: Nov. 12, 1993

Related U.S. Application Data

[63] Continuation-in-part of Ser. No. 976,366, Nov. 13, 1992, abandoned.
[51] Int. Cl.⁶ .................................................. G06F 12/00
[52] U.S. Cl. ............................ 711/141; 711/135; 711/143
[58] Field of Search ................................. 395/400, 425, 395/462, 468, 469, 470, 471, 472

[56] References Cited

U.S. PATENT DOCUMENTS

| | | | |
|---|---|---|---|
| 4,713,755 | 12/1987 | Worley, Jr. et al. | 395/375 |
| 5,301,298 | 4/1994 | Kagan et al. | 395/468 |
| 5,319,766 | 6/1994 | Thaller et al. | 395/473 |

*Primary Examiner*—Jack A. Lane
*Attorney, Agent, or Firm*—Andrew S. Viger; John L. Maxin

[57] ABSTRACT

A write-back coherency system, including FLUSH/INVAL and LOCK protocols, is used, in an exemplary embodiment, in a microprocessor used in a computer system that selectively provides to the processor FLUSH and INVAL signals to implement a limited write-back protocol. The FLUSH/INVAL protocol is used by the computer system to control export and invalidate operations. In response to a FLUSH signal, the microprocessor exports dirty data from the cache. If INVAL is also asserted, the cache is also invalidated (i.e., if FLUSH is asserted and INVAL is not asserted, no invalidation is performed). With the LOCK protocol, LOCKed reads are serviced out of the cache for read hits—however, to maintain compatibility with computer systems that expect a LOCK operation to involve a read followed by a write access to external memory, the microprocessor will still run the external LOCKed read cycle, ignoring the returned data.

6 Claims, 5 Drawing Sheets

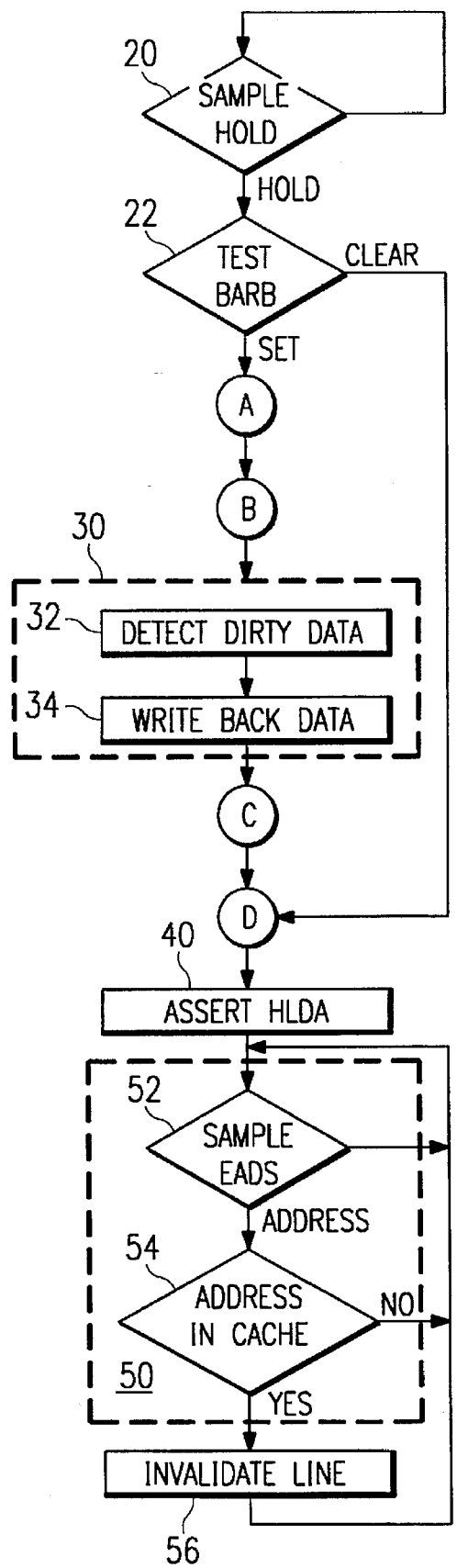
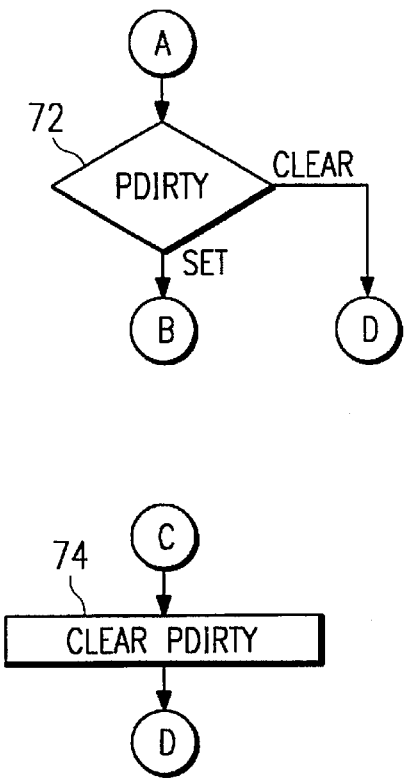
FIG. 3a
FIG. 3c

1) FLUSH ON HOLD

COHERENCY FOR WRITE-BACK CACHE IN A SYSTEM DESIGNED FOR WRITE-THROUGH CACHE USING AN EXPORT/INVALIDATE PROTOCOL

RELATED APPLICATIONS

This application is a continuation-in-part of a U.S. patent application Ser. No. 976,366, titled "Coherency For Write-Back Cache in a System Designed for Write-Through Cache", filed Nov. 13, 1992, and now abandoned.

TECHNICAL FIELD OF THE INVENTION

The invention relates generally to integrated circuits, and more particularly to a circuit and method for maintaining cache coherency for a write-back cache used in a computer system designed to support only write-through cache. Specific features of the invention include: (a) a FLUSH/INVAL protocol to control cache export and flush (i.e., export and invalidate operations, and (b) a LOCK protocol to ensure coherency during LOCK bus cycles. In an exemplary embodiment, the write-back coherency features are used to implement write-back cache for a 486-type microprocessor installed in a computer system that does not support a full write-back protocol otherwise necessary to maintain cache coherency.

This application is related to the following U.S. patent applications, all assigned to the Assignee of this invention: (1) Ser. No. 07/975,783 titled "Method of Allowing Write-Back Caching in a Write-Through Environment", filed Nov. 13, 1992, and now abandoned, (2) Ser. No. 07/935,564, titled "Cache Coherency Without Bus Master Arbitration Signals", filed Aug. 26, 1992, now abandoned, which is a continuation-in-part of (3) Ser. No. 864,399, titled "Cache Control System for Designating Non-Cacheable Regions", filed Apr. 3, 1992, now abandoned, both assigned to the assignee of this application, (4) Ser. No. 07/975,863, titled "Design and Method for Implementing Non-Blocking Write-Back Cache", filed Nov. 13, 1992 and now abandoned, (5) Ser. No. 07/976,902, titled "Servicing Successive Access Requests During A Cache Fill Cycle", filed Nov. 13, 1992, now abandoned and (6) Ser. No. 07/975,804, titled "Region Configuration System and Method For Controlling Memory Subsystem Operations By Address Region", filed Nov. 13, 1992, now abandoned.

BACKGROUND OF THE INVENTION

Cache memory designs support either or both of two basic write policies: write-through or write-back. In write-through mode, each write to a cache line also results in an external bus cycle to write the corresponding block of main memory—as a result, the cache and main memory always have the same data. In write-back mode, writes to the cache do not automatically cause an external bus-write cycle, but rather, main memory is updated only upon replacement, invalidation, or inquiry (write-back without replacement or invalidation) of a cache line containing "dirty" data—data is characterized as "clean" or "dirty" depending on whether the data in the cache is different from the main memory.

In a multi-master computer system, main memory may be accessed by bus masters other than the CPU, including DMA devices and microcontrollers (as well as other CPUs). To maintain coherency between cache memory and main memory, the CPU typically will implement one of two cache coherency techniques: (a) bus snooping—monitoring all addressing operations to detect when another bus master has accessed cached memory locations, or (b) bus arbitration—detecting when another bus master requires control of the system bus such that it may access cacheable regions in main memory. In the case of bus arbitration, the CPU and the other bus masters commonly use bus arbitration signals—such as HOLD and HLDA (HOLD Acknowledge)—as a request-acknowledge handshake protocol for arbitrating control of the memory bus (i.e., any bus that can access memory) and thereby access main memory. To ensure cache coherency, the CPU should invalidate at least those cache locations containing addresses that are accessed by another bus master (the actual cache coherency policy will depend upon a number of factors such as write-through/write-back and whether the CPU is able to snoop the bus to detect addresses driven by the external bus master).

Without limiting the scope of the invention, this background information is provided in the context of a specific problem to which the invention has application: providing a 486-type microprocessor that implements write-back caching along with a cache coherency mechanism to permit installation in a conventional 486-based computer system designed for write-through cache, i.e., either without support for a write-back protocol, or with only limited support for write back caching.

The current 486 generation microprocessor from Intel Corporation only supports write-through caching for its internal cache, even though, as described in the related application (1), the microprocessor includes a control bit for selecting between write-through and write-back caching. Providing a 486-type microprocessor with write-back cache support could provide significant performance advantages because of the reduction in memory bandwidth requirements—fewer external bus cycles are required because not all writes to the cache result in corresponding writes to main memory, and such performance enhancing techniques as write gathering and burst writes become possible.

A 486-based computer system could be configured to support write-back caching, and in particular, to provide the necessary support for a write-back protocol (including snooping and support for any additional microprocessor pins used to implement write-back caching while ensuring cache coherency). However, any new microprocessor design would preferably support installation in any 486-based computer system, whether or not it supported write-back caching and an associated write-back protocol.

Use of such a 486-type microprocessor in a multi-master computer system that lacks support for a write-back protocol presents problems in maintaining cache coherency. The related application (2) discloses a mechanism for maintaining cache coherency for a microprocessor with internal cache designed for installation in conventional 386-based computer systems—the conventional 386-generation microprocessor does not include internal cache, and these systems sometimes do not provide the normal HOLD/HLDA bus master arbitration signals to the microprocessor (or do not otherwise provide for cache coherency such as with bus snooping). However, 486-based computer systems, which are designed for a microprocessor with internal cache, present different cache coherency issues in attempting to introduce write-back caching: (a) data integrity, and (b) compatibility with cache invalidation specifications.

Data integrity is implicated because of the bus arbitration protocol used to grant memory access to bus masters—an external bus master (such as a disk controller) requests control of the bus by asserting HOLD, and then, after HLDA is returned by the microprocessor, asserts FADS while driving addresses onto the memory bus. This is not a problem for write-through cache designs because main memory contains the most current copy of data—when the bus is arbitrated away using the HOLD/HLDA protocol, the microprocessor snoops the bus and invalidates any cache lines containing addresses driven by the external bus master. However, for a write-back cache design, the most current copy of data may be in the cache rather than in main memory—if the bus master attempts to access memory locations for which corresponding locations in the cache contain dirty data, coherency will be violated without a write-back coherency protocol (a) to allow the microprocessor to monitor each address driven by the bus master, and (b) for addresses representing dirty data, to write back or flush (write-back and invalidate) the associated cache line (or, at least, the dirty data).

Compatibility with cache invalidation specifications is implicated because the conventional 486-type microprocessor specification requires single-cycle cache line invalidation—when a bus master drives an address after asserting EADS, the microprocessor is expected to invalidate the corresponding cache line (in the case of a cache hit) in a single clock cycle. A flush operation involving both write-back and invalidation would typically require two clock cycles to complete.

Moreover, while the 486-instruction set includes INVD and WBINVD cache invalidation instructions that differentiate between write-through and write-back cache, the WBINVD instruction is only supported for external write-back cache (because the conventional 486-type microprocessor only supports a write-through internal cache). Thus, software written for conventional 486-type microprocessor may use the INVD instruction for the internal write-through cache, which would cause a coherency problem if the internal cache were write-back.

Another compatibility issue is presented by LOCK operations. In the 486-instruction set, a microprocessor executing a LOCKed bus cycle is given control of the memory bus for a read-modify-write operation (such as for semaphore operations). The conventional approach is to send the read and the write to the bus to access external memory, regardless of whether the data is in the cache—many computer system chipsets expect to see both the read and the write for a LOCKed bus cycle. However, in a write back environment, the external memory may not have the most current copy of data.

Accordingly, a specific object of the invention is to provide a design for a 486-type microprocessor that supports write-back cache, including implementing a cache coherency mechanism to support installation in a computer system that at most supports limited write-back protocol for maintaining cache coherency, and provides support for LOCKed bus cycles in a manner compatible with existing computer systems.

SUMMARY OF THE INVENTION

The invention is a write-back coherency system for a processor-cache combination in which the cache is operable in write-back mode. The processor combination is used in a computer system that includes external memory, and that selectively provides to the processor FLUSH and INVAL signals.

In one aspect of the invention, the write-back coherency system implements a FLUSH/INVAL protocol in which the FLUSH and INVAL signals are used by the computer system to control export and invalidate operations. FLUSH logic is responsive to the FLUSH signal to export dirty data from at least a portion of the cache. INVAL logic is responsive to the INVAL signal to invalidate at least a portion of the cache, such that, if FLUSH is asserted and INVAL is not asserted, the contents of the exported cache locations remain valid. In an exemplary embodiment, an invalidation operation invalidates the entire cache.

In another aspect of the invention, the write-back coherency system implements a LOCK protocol in which the LOCKed read of a LOCK operation can be serviced by the cache to improve performance, but also results in an external access to ensure compatibility. The LOCK protocol involves: (a) in response to the execution of a LOCK operation by the processor, accessing both the cache and external memory with the read, and (b) if the read access hits in the cache, supplying the corresponding data to the processor and ignoring the corresponding data returned from external memory, or © if the read access missed in the cache, supplying the corresponding data returned from external memory to the processor. In an exemplary embodiment, if the read access hits in the cache, the write operation will also be written to the cache.

The technical advantages of the invention include the following. An export-on-HOLD feature of the write-back coherency system enables the performance benefits of write-back caching to be realized in computer systems that lack the necessary functionality to maintain cache coherency, and in particular, write-back caching can be used in a microprocessor that can be installed into sockets that do not support the pins necessary to maintain cache coherency. The FLUSH/INVAL feature provides a cache coherency protocol for computer systems that are able to implement a limited write-back protocol. The FLUSH/INVAL protocol enables the computer system to control export operations by selectively performing either export-only or flush(export and invalidate) operations—this feature allows such systems to offer a hardware alternative to the export-on-HOLD protocol of the invention. The LOCK feature provides the performance advantage of supplying read data directly to the microprocessor core (for cache hits), recognizing that in a write-back environment, the microprocessor cache and external memory may not be coherent. The LOCK protocol ensures compatibility for computer systems that expect a LOCKed bus cycle to result in both external read and write cycles.

For a more complete understanding of the invention, and for further features and advantages, reference is now made to the Detailed Description of an exemplary embodiment of the invention, together with the accompanying Drawings, it being understood that the invention encompasses any modifications or alternative embodiments that fall within the scope of the claims.

BRIEF DESCRIPTION OF THE DRAWINGS

FIGS. 3a, 3b, and 3c are flow diagrams of the export-on-HOLD and PDIRTY functions of the write-back coherency system.

DETAILED DESCRIPTION OF THE INVENTION

Figure 1:
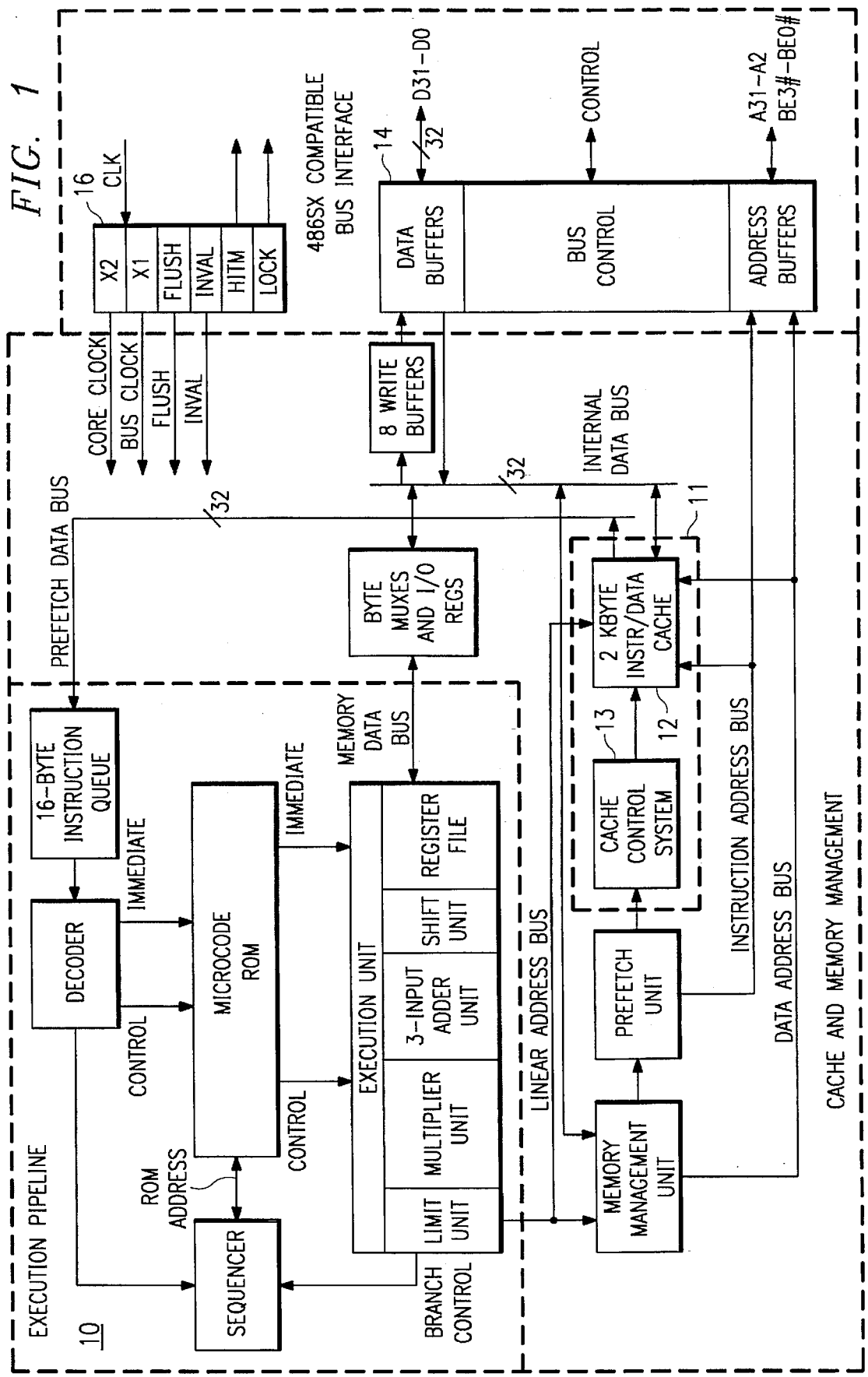
FIG. 1 illustrates a 486-type microprocessor incorporating a write-back cache.

The detailed description of an exemplary embodiment of the write-back coherency system is organized as follows:

1. Prior 386-Type Microprocessor
1.1. Cache Coherency With BARB
1.2. Cache Coherency Without BARB
2. Write-Back Coherency
2.1. Write-Back Cache
2.2 BARB Function
   2.2.1. Export-on-HOLD
   2.2.2. Cache Line Invalidation
   2.2.3. Switch To Write-Through
2.3. PDIRTY Function
2.4. X%DIRTY Function
2.5. INVD Instruction
2.6. FLUSH/INVAL Protocol
2.7. LOCK Protocol
3. Conclusion This organizational table, and the corresponding headings used in this Detailed Description, are provided for convenience of reference only.

The exemplary write-back coherency system is used to implement write-back caching, and maintain cache coherency, in a 486-type microprocessor installed in a multi-master computer system that supports only write-through cache (i.e., the system does not support a write-back protocol for maintaining cache coherency). The microprocessor includes in a control register CR0 an NW bit for selecting between write-through and write-back modes, but uses the write-back configuration method described in the related application (1) to ensure compatibility with conventional 486-type microprocessor designs where the microprocessor does not support write-back operations and will issue a general protection fault if the NW bit is set in write-back mode.

The microprocessor includes an internal, single-ported unified cache that can be switched between write-back mode and conventional 486 write-through mode. The unified cache holds both instructions and data—this Detailed Description uses the term "data" to mean both instruction and data, and the term "address" to mean the memory address for either instruction or data.

1. Prior 386-Type Microprocessor

By way of further background, the related applications (2) and (3) describe a cache control and cache coherency systems for a 386-type microprocessor with an internal cache. Cache coherency is maintained using either (a) a bus arbitration (BARB) function using the conventional bus arbitration signals HOLD and HLDA, or (b) a cache coherency system where bus arbitration signals can not or are not used.

1.1 Cache Coherency With BARB

As described in the related applications (2) and (3), because that microprocessor does not support snooping (i.e., monitoring bus activity during memory access operations by other bus masters), cache coherency considerations dictate that the contents of the internal cache be invalidated when cacheable data may be modified in external memory by another bus master.

One technique for implementing cache coherency was the BARB function. A cache configuration register includes a BARB bit that if set causes the cache to be invalidated each time the memory bus is arbitrated away in response to the assertion of HOLD by another bus master and the return of HLDA by the microprocessor.

Alternatively, the internal cache can be invalidated using FLUSH (if the FLUSH bit is set in the cache configuration register) or the INVD and WBINVD instructions. With respect to FLUSH signaling, the microprocessor samples the FLUSH# input each clock cycle, and if asserted, invalidates the entire contents of the internal cache.

1.2. Cache Coherency Without BARB

As described in related application (2), because some 386-based multi-master computer systems do not make available to the microprocessor socket all the bus arbitration signals, for a microprocessor designed to be compatible with these computer systems, bus arbitration signals could not be used to reliably maintain coherency of an internal cache. This related application describes a cache coherency system for maintaining cache coherency in this environment.

In an external-chip implementation, the cache coherency system comprises two PLAs—a FLUSH module and a WAVESHAPING module. The FLUSH module (a) receives selected bus cycle definition and control signals from the microprocessor, (b) detects FLUSH (cache invalidation) conditions, (i.e., bus master synchronization events), and for each such FLUSH condition, (c) provides a FLUSH output signal. The WAVESHAPING module provides a corresponding CPU/FLUSH signal to the microprocessor with the appropriate set up and hold time.

The exemplary FLUSH conditions that cause cache invalidation are: (a) hardware generated interrupts, and (b) read or read/write accesses to I/O address space, except for those directed to a hard disk or an external coprocessor. If the bus architecture uses memory-mapped I/O, accesses to selected regions of memory-mapped I/O space could also be used.

2. Write-Back Coherency

The exemplary write-back coherency system of this invention is implemented in a 486-type microprocessor that is compatible with conventional 486-type microprocessors. The write-back coherency system enables this microprocessor to be installed in multi-master computer systems that do not support a write-back protocol otherwise necessary for maintaining cache coherency while in write-back mode, allowing such systems to be configured for write-back caching.

For purposes of compatibility with conventional 486-type microprocessor designs, the exemplary microprocessor uses the write-back configuration system described in the related application (1)—providing an enabling disclosure of the write-back coherency system of this invention does not require a detailed description of the write-back configuration system. In general, the write-back configuration technique involves: (a) in a computer system configured for write-back caching, inhibiting software (or hardware) from inadvertently placing the cache in write-through mode (such as by setting an NW control bit to write-through in switching to cache-enabled operation), and (b) in a computer system configured for write-through caching, operating in a manner with normal write-through caching (such as issuing a general protection fault if software attempts to erroneously set the NW control bit to write-back mode). Thus, the write-back configuration technique allows the microprocessor of this invention to be configured for write-back caching using the LOCK_NW control bit.

FIG. 1 illustrates an exemplary microprocessor 10, including an internal cache memory system 11 comprising a cache 12 and a cache control system 13. A bus interface unit 14 includes bus control logic, and in addition to other bus control functions, implements the HOLD/HLDA request-acknowledge bus arbitration protocol.

The microprocessor 10 receives/provides a number of signals 16 from/to the computer system, including FLUSH and INVAL, and LOCK. FLUSH and INVAL are provided to the cache control system 13 for implementing the FLUSH/INVAL protocol according to the invention. LOCK is asserted to the computer system for LOCKed bus cycles.

The cache is designed to operate as either write-back or write-through. The cache control system includes two cache configuration registers for controlling the cache (and other functions), including a control configuration register that includes both the BARB bit and the LOCK_NW bit. These registers exist in I/O space—access is achieved by writing a register index to I/O port 22h, and then using I/O port 23h for data transfer. In particular, if the BARB bit is set, export-on-HOLD write-back coherency is enabled, and all dirty data is written back (exported) when HOLD is requested and prior to asserting HLDA.

2.1. Write-Back Cache

Providing an enabling disclosure of the write-back coherency system of this invention does not require a detailed description of the design of a write-back cache, which would be a routine design choice for those skilled in the art. The related applications (4) and (5) provide additional description of a cache memory system 12 (and its operation in write-back mode), while the related application (6) provides additional description of the cache configuration registers. This Section provides a general description of the exemplary write-back cache design.

The exemplary cache is a 2 Kbyte unified (instruction and data) cache with a cache line size of 16 bytes (four dwords). The cache can be organized as four-way set associative, and can be operated in either write-through or write-back mode. Each four dword cache line has a 23-bit tag and one valid bit and four dirty bits (one for each dword). The single valid bit per cache line means that the entire cache line is either valid or invalid; the four dirty bits are provided to minimize the number of dword bus writes needed during export or flush operations. The general organization and operation of the cache is conventional.

Figure 2:
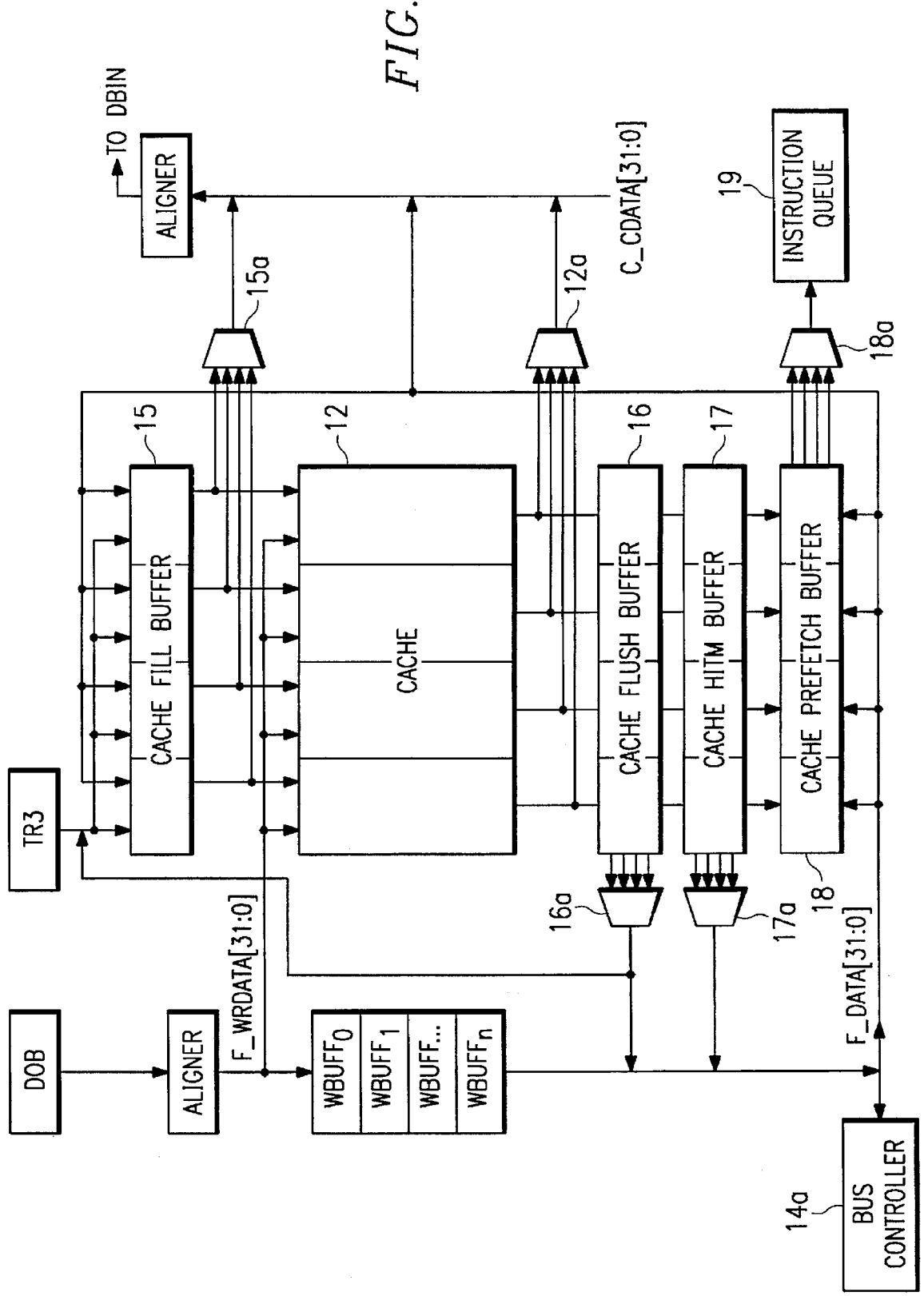
FIG. 2 illustrates the exemplary write-back cache.

FIG. 2 illustrates the exemplary write-back cache 12, which includes four input/output buffers, each four dwords wide: a cache fill buffer 15, a cache write-back buffer 16, a cache inquiry buffer 17, and a cache prefetch buffer 18.

The cache fill buffer 15 is used to assemble the incoming dwords of a burst mode cache fill cycle—when a complete cache line has been loaded (via bus controller 14), the four dwords are input (memory aligned) to the cache 12 to complete the cache fill cycle. The related application (5) describes a cache-fill pending system for servicing (either from the cache fill buffer or the external data bus) successive requests to access a cache line during a cache fill cycle, i.e., access requests after the initial request that triggered the cache fill cycle.

The cache write-back buffer 16 stages cache lines for write-back operations, such as for cache line replacement, or during cache export or flush (i.e., export and invalidate). For cache line replacements, the write-back buffer is filled in the same dock that the new cache line will be written—by doing lookup/read of data to be replaced in the same cycle as the replacement is to occur, coherency issues are eased. Export and flush operations will occur only if the cache contains dirty data (see, Section 2.2).

The write-back buffer outputs through a multiplexer 16a to the bus controller 14 for transfer to main memory. The write-back buffer includes a dirty bit per dword, and is not invalidated until the last dword has been accepted by the bus controller. Thus, for replacement operations, the cache line to be replaced is transferred to the write-back buffer, and then the dirty bits are checked to determine whether write-back is required. Similarly, for export and flush operations, each cache line is read into the write-back buffer and then the dirty bits are tested. Based on the state of the dirty bits, the multiplexer 16a is used to select which dwords, if any, are written back.

The cache inquiry buffer 17 holds the cache line that is the subject of an external inquiry, such as during snooping operations conducted by the microprocessor when another bus master is driving addresses on the external memory bus (to insure cache coherency). The inquiry buffer outputs through a multiplexer 17a to the bus controller 14. This buffer is for use in supporting inquiry in computer systems that support a write-back protocol—it is not used in the exemplary environment where the computer system is only designed to support write-through caching.

The cache prefetch buffer 18 is used to keep the number of instruction accesses to the cache to a minimum. Prefetch instruction requests are first looked up in the prefetch buffer—if the prefetch misses, it is looked up in the cache. If the prefetch misses in the cache, a prefetch cycle is run, and the prefetch buffer is loaded from the external data bus, simultaneously with the instruction being supplied to the cache fill buffer 15 and the instruction queue.

The principal aspects of the write-back coherency system of the invention, which is used in the exemplary microprocessor to maintain coherency of the cache 12 while operating in write-back mode, are: (a) a BARB export-on-hold function, (b) a PDIRTY instantaneous-invalidation function, (c) X%DIRTY latency-minimization function, (d) an INVD instruction-execution function, (e) FLUSH/INVAL, and (f) LOCK These functions are implemented conventionally using sequential (combinatorial and clocked) logic design techniques.

2.2. BARB Function

The BARB write-back coherency feature of the invention causes dirty data in the cache to be exported to main memory when another bus master asserts HOLD, and before the microprocessor returns HLDA, thereby ensuring that main memory will be updated with current data from the cache prior to any access by the requesting bus master.

FIG. 3a illustrates the BARB export-on-HOLD function. Also referring to FIG. 1, the bus control logic at the bus interface unit 14 includes bus arbitration logic that samples (20) the HOLD pin to detect when another bus master requests access to the memory bus for accessing main memory. When a requesting bus master asserts HOLD, the bus arbitration logic signals this arbitration-request condition to the cache control system 13.

Write-back coherency logic in the cache control system 13 tests the BARB bit, and if clear (i.e., export-on-HOLD disabled), signals the bus arbitration logic that it can return the HLDA response to the requesting bus master. If, however, the BARB bit is set, the export-on-HOLD function of the write-back coherency system is enabled.

2.2.1. Export-On-HOLD

When export-on-HOLD is enabled, the write back coherency logic performs a conventional data export operation (30). The dirty bits for each line in the cache are checked to detect (32) those cache units containing dirty data (i.e., any dirty dword). For the exemplary implementation of write-back caching, those cache units (dwords) that are dirty are written back (34) to main memory in a memory write cycle. Alternatively, the write-back cache design could export an entire cache line if any cache unit in the line is dirty, at the expense of some unnecessary bus traffic.

This export operation for dirty data updates main memory to ensure that any access to that data by the requesting bus master will use the more current data, which is in the cache. Note that this operation is not a conventional flush operation in that no cache lines are invalidated—the function of the export operation is merely to update main memory with the more current version of data that has been modified while in the cache.

After the export operation is complete, the write-back coherency logic signals the bus arbitration logic to complete the HOLD/HLDA handshake by asserting (40) HLDA, thereby granting control of the memory bus to the requesting bus master. The requesting bus master then asserts the EADS address strobe, and drives addresses onto the memory bus.

2.2.2. Cache-Line Invalidation

Conventional snooping logic is included in the bus control logic of the BIU 14 and the cache control system 13 for snooping the memory bus. When enabled by the assertion of HLDA, the snooping logic monitors (50) addresses driven onto the memory bus by the requesting bus master. Specifically, the snooping logic in the bus controller samples (52) the EADS strobe, and notifies snooping logic in the cache control system that the next bus master address appearing on the address bus (through the address buffers) should be used to check the contents of the cache and determine (54) whether the corresponding data has been cached.

If this snooping logic detects that the requesting bus master is addressing a location in main memory that is currently cached, it performs an invalidation operation (56) to invalidate the entire cache line containing the addressed data. This snooping function ensures that cache coherency will be maintained—an access to cached data by the requesting bus master is assumed to result in a modification of that data in main memory such that the copy of that data in the cache would then be invalid.

In performing this snooping operation after the export-on-HOLD function has cleaned the cache of dirty data, the exemplary microprocessor functions compatibly with conventional 486-type microprocessors with write-through caching. That is, snooping operations can be performed by invalidating cache lines that correspond to addresses driven by the external bus master without having to perform a flush (export prior to invalidation) operation with the associated bus write-back cycle (see, Sections 2.2.3 and 2.3). This contrasts with the snooping that would be performed by the microprocessor if the computer system supported, a write back protocol, in which case the export-on-HOLD function would not be needed, but rather, the microprocessor would snoop the addresses driven by the external bus master, and for a hit in the cache, assert HITM and flush the cache line.

When the requesting bus master has completed its memory access operation, it then completes the HOLD/HLDA request-acknowledge handshake by deasserting HOLD. The microprocessor (which continues to sample HOLD while asserting HLDA) responds by deasserting HLDA, allowing other bus masters, including the microprocessor to access main memory over the memory bus.

Figure 3B:
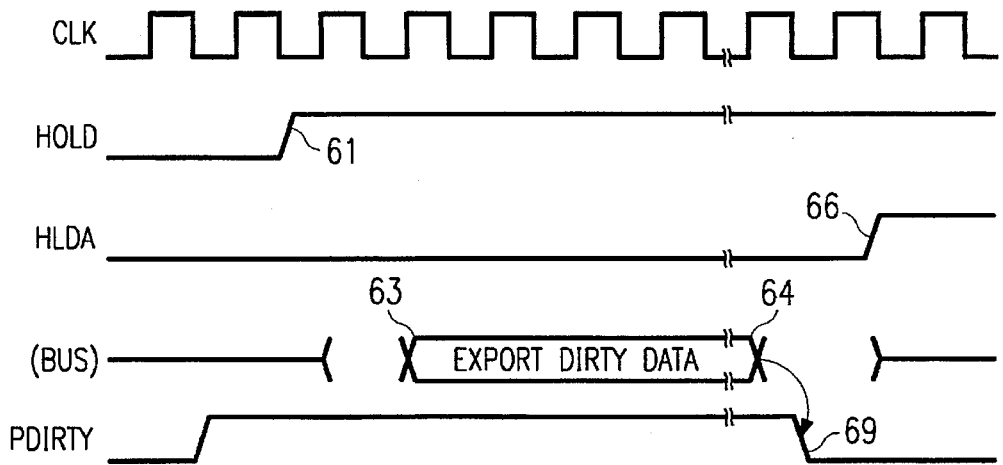

FIG. 3b provides a timing diagram illustrating the export-on-HOLD function, and specifically the signals CLK HOLD, and HLDA, as well as the state of the memory bus. In summary, when HOLD is asserted (61), the microprocessor exports dirty data (63) to main memory over the memory bus. When the cache is clean (64), HLDA is asserted 66, allowing the external bus master to control the bus.

2.2.3. Switch to Write-Through

While the requesting bus master is accessing main memory, the CPU in the microprocessor can continue to execute instructions out of the cache. In the case of read access requests issued by the CPU to the cache, if the data is cached it will be returned to the CPU—if the access request misses in the cache the CPU will stall until the microprocessor can run the necessary bus cycles to retrieve the corresponding cache line from main memory.

In the case of a write access by the CPU, a coherency issue is raised if the write access hits in the cache—a miss in the cache will result in a bus write cycle to write the data into main memory (which may or may not result in a cache fill cycle depending upon the cache write allocation policy). That is, because the cache is in write-back mode, the write access hit will result in data being written into the cache but not written out to main memory.

Thus, the CPU will be able to complete the write access without being stalled by the requirement of a bus write cycle. This write access may occur while the requesting bus master is accessing the same data in main memory, creating dirty data that will not be exported to main memory before the memory access by the requesting bus master. (Note that this coherency problem is avoided if the computer system supports a write-back protocol.)

The exemplary microprocessor resolves this cache coherency problem by dynamically switching the cache to write-through mode after the dirty data export operation, and then switching back to write-back mode when the memory bus is arbitrated back to the microprocessor (i.e., when the requesting bus master deasserts HOLD and the bus control logic responds by deasserting HLDA. In this implementation, after an export-on-HOLD operation, the cache is available to the CPU (and other cache requesters) for read accesses (hit or miss) and write miss accesses. However, a write hit will be posted to a write buffer for a bus write cycle (if no write buffer is available, the CPU will stall).

2.3. PDIRTY Instantaneous-Invalidation

The PDIRTY write-back coherency feature of the invention allows the cache to be invalidated in a single-cycle without having to test each cache line to determine whether it contains dirty data that would have to be exported to main memory. This same PDIRTY function can be applied to single line invalidations (such as occur during bus snooping).

The PDIRTY instantaneous invalidation function is implemented using a PDIRTY internal status bit. After an export operation (and at reset), PDIRTY is set to indicate that the cache is clean, i.e., that all dirty bits have been cleared. As soon as a write occurs in write-back mode (i.e., without causing a write-through bus write cycle), the cache write-back coherency logic sets PDIRTY, indicating that the cache now contains dirty data.

Referring to FIGS. 1, 3b, and 3c, after the bus arbitration logic detects HOLD (20) and signals an arbitration-request condition, and the cache control system determines (22) that the BARB bit is set, the write-back coherency logic in the cache control system 13 tests (72, FIG. 3c) the PDIRTY bit. If PDIRTY is clear, the export operation can be skipped, and the bus arbitration logic will be notified to assert HLDA (40) immediately.

If PDIRTY is set, indicating that the cache potentially contains dirty data, the write-back coherency logic then proceeds to perform a data export operation (30). When the export operation is complete, PDIRTY is cleared (74, FIG. 3c). With PDIRTY cleared, the snooping logic performs each cache-line invalidation operation (56) in a single cycle (no external bus cycles are run). That is, the snooping logic avoids the normal write-back invalidation overhead of first testing (32) the dirty bits for the cache line being invalidated (which, because of the preceding export operation, is clean) prior to beginning another invalidation (which would be a two cycle invalidation operation). An alternative is to read the cache line into either the write-back or inquiry buffer (16 or 17, FIG. 2) in one cycle, and then check the dirty bits in the next cycle—the next cache line invalidation could not be accepted until those dirty bits were checked.

Moreover, with PDIRTY clear, the cache can respond to a FLUSH signal with a single cycle invalidation of the entire contents of the cache. That is, since PDIRTY clear obviates the need to export dirty data, an export operation to read lines of the cache to detect dirty data is not required.

In addition to providing for single-cycle cache and cache-line invalidation during write-back mode, this feature enables the microprocessor to satisfy the single-cycle cache-line invalidation specification for conventional 486-type microprocessors operating in write-through mode.

A timing signal for the PDIRTY bit is shown in FIG. 2b. PDIRTY is set (68) at some time prior to HOLD being asserted (61), and is then cleared (69) after the completion of the export operation (64).

2.3. X%DIRTY Latency-Minimization

The X%DIRTY write-back coherency feature of the invention allows the operating system to impose a maximum guaranteed HLDA latency based on a predetermined percentage of the cache that can contain dirty data at any time. In addition to permitting write-back performance tweaking, this feature enables the microprocessor to be used with certain bus master products (such as certain disk controllers) that expect HLDA to be returned by the microprocessor within a maximum latency time after HOLD is asserted.

The X%DIRTY function of the write-back coherency system is implemented using two registers—CDIRTYMAX and CDIRTYCUR—in the cache control system. The CDIRTYMAX register stores a predetermined value corresponding to the maximum allowable number of cache locations containing dirty data. The CDIRTYCUR stores a value corresponding to the current number of cache locations containing dirty data. Both of these registers are large enough to binary encode the number of smallest units of the cache for which dirty status information is maintained—dwords in the case of the exemplary cache.

CDIRTYMAX is initialized at reset by loading under operating system control the CDIRTYMAX value. CDIRTYCUR is initialized to zero at power-up or hard-reset, or after cache export or flush (export followed by invalidation), and is then incremented/decremented during normal write-back caching operation.

The write-back coherency logic in the cache control system (13 in FIG. 1) includes X%DIRTY logic that operates during write-back mode to increment/decrement the CDIRTYCUR as the write accesses and dirty data exports occur. At the same time, the X%DIRTY logic monitors the value of CDIRTYCUR, and dynamically switches the cache from write-back to write-through mode during any period in which a write to the cache would increase CDIRTYCUR when CDIRTYCUR is already equal to or greater than CDIRTYMAX.

Figure 4A:
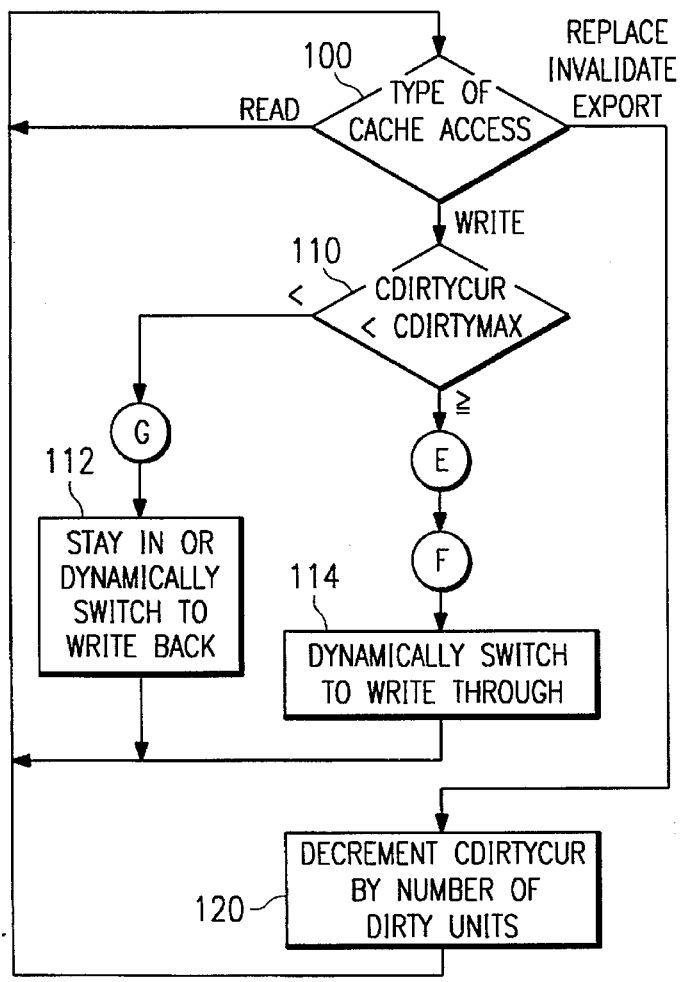
FIGS. 4a and 4b are flow diagrams illustrating the X%DIRTY function of the write-back coherency system.

FIG. 4a illustrates the X%DIRTY write-back coherency function. While in write-back mode, the X%DIRTY logic monitors (100) each type of cache access: Read, Write, Replace, Invalidate, or Export. Read accesses have no effect on the amount of dirty data in the cache, and are ignored.

If the cache access is a write, the X%DIRTY logic compares (110) CDIRTYCUR and CDIRTYMAX. If CDIRTYCUR is less than CDIRTYMAX, then the write access does not result in a switch to write-through mode (112).

If CDIRTYCUR is greater than or equal to CDIRTYMAX, then the X%DIRTY logic will cause the cache control system to dynamically switch to write-through mode (114). The write access will complete but will not result in an increase in dirty cache units because the write will also be written through to main memory.

The X%DIRTY logic will continue to monitor (100) the type of cache access. If the cache access is a replace, invalidate, or export operation, CDIRTYCUR will be correspondingly decremented (120). Then, at the next write access, if CDIRTYCUR has been decremented below CDIRTYMAX, the X%DIRTY logic will detect that CDIRTYCUR is less than CDIRTYMAX (110), and will cause the cache control system to dynamically switch back to write-back mode (112).

Figure 4B:
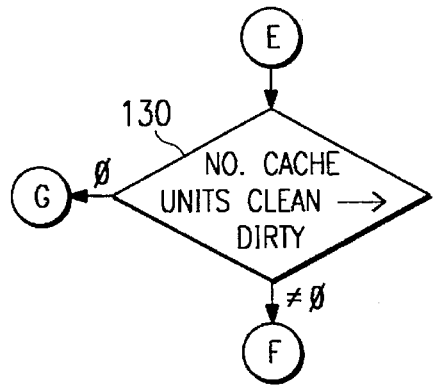

FIG. 4b, in conjunction with FIG. 4a, illustrates a modification of the above scheme for handling the situation where a write access occurs in write-back mode with CDIRTYCUR greater than or equal to CDIRTYMAX. CDIRTYCUR can exceed CDIRTYMAX because a write access may dirty more than one cache unit at a time, causing CDIRTYCUR to increment from less that CDIRTYMAX to greater than CDIRTYMAX For the exemplary write-back coherency system, if a write access occurs when CDIRTYCUR is greater than or equal to CDIRTYMAX (110, FIG. 4a), the X%DIRTY logic interrogates the relevant cache line to determine (130, FIG. 4b) whether the write access will cause the number of dirty units to increase. If the number of dirty units will increase, then the cache is dynamically switched to write-through mode (114, FIG. 4a) for that write access.

If, however, the write access will not result in an increase in the number of dirty cache units, such as when the write access is to cache units that are already dirty, then the X%DIRTY logic will not cause a switch to write-through mode (112, FIG. 4a).

2.4. INVD Instruction

The INVD instruction-execution feature of the invention causes the INVD instruction to be treated as a WBINVD instruction, thereby invoking an export INVAL operation in which cache invalidation is preceded by an export operation to write back any dirty data.

To provide compatibility with existing software that may use the INVD instruction to invalidate the internal cache (which the software assumes is write-through), the write-back coherency technique of the invention causes the INVD instruction to be interpreted as a WBINVD instruction. Specifically, the cache control system interprets INVD as WBINVD and performs a flush—prior to invalidation, an export operation is performed, including checking PDIRTY to determine if an instantaneous invalidation can be performed (thereby obviating the write back of dirty data).

2.5. FLUSH/INVAL Protocol

The FLUSH/INVAL feature of the invention provides a mechanism by which a computer system can implement external control over the microprocessor's write-back cache without implementing a full write-back protocol. Specifically, the FLUSH/INVAL protocol enables the computer system to control write-back export operations to maintain cache coherency.

Figure 5:
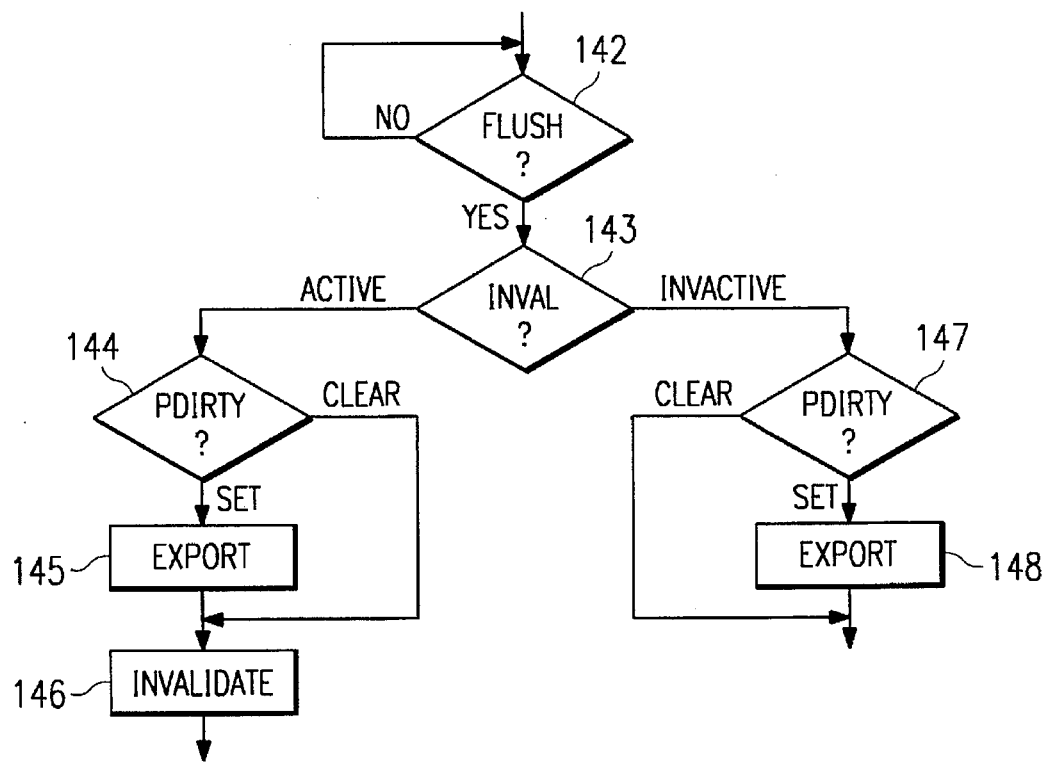
FIG. 5 is a flow diagram illustrating the FLUSH/INVAL protocol of the write-back coherency system.

FIG. 5 illustrates an exemplary embodiment of the FLUSH/INVAL protocol. The cache control system (13 in FIG. 1) receives FLUSH and INVAL signals from the computer system. FLUSH and INVAL are sampled (142, 143) on clock edges by the microprocessor.

If FLUSH is asserted by the computer system, the cache control system will implement an export operation. If INVAL (143) is also asserted, and PDIRTY is set (144), then the cache control exports (145) the dirty data, and then invalidates the cache (146)—if PDIRTY is clear, export is unnecessary, and the cache is immediately invalidated (single cycle invalidation). If INVAL (143) is sampled inactive, and PDIRTY is set (147), then the cache control system exports (148) the dirty data without effecting an invalidation—again, if PDIRTY is clear, an export operation is not necessary.

For the exemplary embodiment, if the cache contains dirty data (PDIRTY set), the microprocessor will assert HITM# to the computer system until completion of all write-back cycles required to complete the export operation.

The FLUSH/INVAL protocol permits the computer system to selectively implement cache coherency operations. For example, flush operations (export and invalidate) can be limited to cache coherency events in which another bus master may affect data in external memory that is cacheable (and therefore, may be in the microprocessor's cache).

2.6. LOCK Protocol

The LOCK feature of the invention provides a mechanism to improve performance of LOCK operations, while maintaining compatibility with 486-type computer systems that expect a LOCK bus cycle to include external read and write bus cycles.

Figure 6:
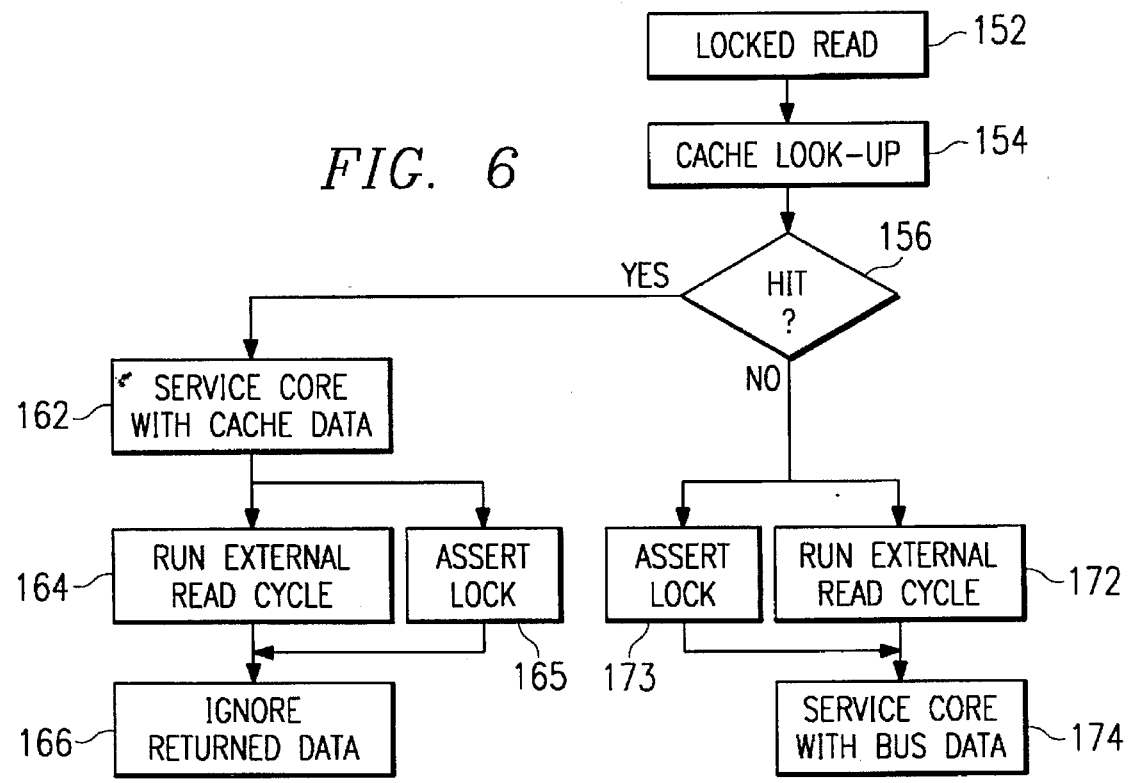
FIG. 6 is a flow diagram illustrating the LOCK protocol of the write-back coherency system.

FIG. 6 illustrates an exemplary embodiment of the LOCK protocol. The microprocessor (FIG. 1) asserts LOCK for all LOCK operations requiring multiple indivisible bus cycles—for example, read-modify-write.

If a LOCK instruction is executed (152) by the microprocessor, LOCK is asserted externally and to the cache control system (13 in FIG. 1). The cache control system will access the cache (154) to look-up the LOCKed read.

If the read access hits in the cache, then the read data will be supplied to the microprocessor core (162). Even though the write-back cache contains the most current copy of the accessed data, for compatibility, the bus interface unit (14 in FIG. 1) will run an external read cycle (164), asserting LOCK (166) to identify the LOCK cycle—the cache control system will ignore the data renamed in response to the external read cycle.

If the read access misses in the cache, the bus interface unit runs the external read cycle (172) with LOCK asserted (174), and the read data returned is supplied to the microprocessor core (174). Ordinarily, LOCK operations are noncacheable, so that the read miss will not result in a cache line fill.

For the LOCKed write operation, the bus interface unit runs an external write cycle to write the data to external memory. For the exemplary embodiment, if the look-up of the LOCKed read hit in the cache, the write data is written into the cache in anticipation of another access to that data. Alternatively, the cache line could be invalidated in recognition of the fact that LOCK operations are non-cacheable.

The exemplary LOCK protocol improves performance by supplying the microprocessor core with read data for cache hits—the performance improvement is particularly significant if the read data in the cache is dirty, thereby avoiding having to first run a write-back cycle to export the dirty data, and then read external memory. At the same time, even though the external read cycle is unnecessary because the cache has the most current copy of the data, compatibility is maintained by running the external read cycle and ignoring the returned data.

3. Conclusion

Although the Detailed Description of the invention has been directed to certain exemplary embodiments, various modifications of these embodiments, as well as alternative embodiments, will be suggested to those smiled in the art. For example, the invention has general applicability to maintaining cache coherency for a write-back cache memory operating in an environment without a write-back coherency protocol. Cache organization, including the specific implementation of caching operations (reads, writes, replacements, invalidations, exports), and the associated cache control operations, as well as such organizational issues as the number of cache units in a cache line, are implementation details within the skill of the art, and are not important to the invention. The processor-cache combination will typically be integrated into a single microprocessor, although the cache may be external. The term "cache" is meant to be generic or a primary memory, while the term "register" is meant to be generic for a storage location.

The invention encompasses any modifications or alternative embodiments that fall within the scope of the claims.

We claim:

1. In an x86 computer system designed to use an x86 microprocessor with an internal cache that supports both write-through and write-back modes, where the computer system does not implement a write-back coherency protocol to support operating the internal cache in write-back mode and ensure coherency with main memory during bus master operations, a write-back coherency system to support use of an x86 microprocessor in which the internal cache is operable in write-back mode, comprising:

(a) an export signal and an invalidate signal, selectively issued by the computer system in response to detecting a DMA operation; and (b) cache control logic in the microprocessor responsive to the export and invalidate signals to (i) if the export signal is active and the invalidate signal is inactive, export all dirty data from the internal cache, and (ii) if the export signal is active and the invalidate signal is active, export all dirty data from the internal cache and then invalidate the internal cache.

2. The write-back coherency system of claim 1, wherein the export and invalidate signals are respectively designated FLUSH and INVAL.

3. The write-back coherency method of claim 1, wherein the export and invalidate signals are respectively designated FLUSH and INVAL.

4. In an x86 computer system designed to use an x86 microprocessor with an internal cache that supports both write-through and write-back modes, where the computer system does not implement a write-back coherency protocol to support operating the internal cache in write-back mode and ensure coherency with main memory during bus master operations, a write-back coherency system to support use of an x86 microprocessor in which the internal cache is operable in write-back mode, comprising:

(a) cache coherency means in the computer system for selectively providing, in response to the detection of a DMA operation, an export signal and an invalidate signal to the microprocessor; and (b) cache control means in the microprocessor, responsive to the export and invalidate signals, for (i) if the export signal is active and the invalidate signal is inactive, exporting dirty data from the internal cache, and (ii) if the export signal is active and the invalidate signal is active, exporting dirty data from the internal cache and then invalidating the internal cache.

5. The write-back coherency system of claim 4, wherein the export and invalidate signals are respectively designated FLUSH and INVAL.

6. In an x86 computer system designed to use an x86 microprocessor with an internal cache that supports both write-through and write-back modes, where the computer system does not implement a write-back coherency protocol to support operating the internal cache in write-back mode and ensure coherency with main memory during bus master operations, upon detection of a DMA operation, a method of ensuring cache coherency for an x86 microprocessor in which the internal cache is operable in write-back mode, comprising the steps:

(a) in response to the detection of a DMA Operation, providing an export signal and an invalidate signal to the microprocessor;

(b) if the export signal is active and the invalidate signal is inactive, exporting dirty data from the internal cache, and (c) if the export signal is active and the invalidate signal is active, exporting dirty data from the internal cache and then invalidating the internal cache.

* * * * *